(12) United States Patent
Shen et al.

(10) Patent No.: US 8,233,233 B1
(45) Date of Patent: Jul. 31, 2012

(54) DEVICES INCLUDING A WRITE POLE TIP WITH A CONVEX SHAPE

(75) Inventors: Zhe Shen, Lakeville, MN (US);
Huaqing Yin, Eden Prairie, MN (US);
Jianhua Xue, Maple Grove, MN (US);
Mark Gubbins, Letterkenny (IR); Alex Wong, Londonderry (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/173,854

(22) Filed: Jun. 30, 2011

(51) Int. Cl.
*G11B 5/147* (2006.01)
(52) U.S. Cl. ................................. 360/125.03
(58) Field of Classification Search .............. 360/125.03
See application file for complete search history.

(56) References Cited

U.S. PATENT DOCUMENTS

| | | | |
|---|---|---|---|
| 5,729,413 A | 3/1998 | Gooch et al. | |
| 6,621,659 B1 | 9/2003 | Shukh et al. | |
| 6,680,815 B2 | 1/2004 | Sasaki | |
| 6,693,768 B1 * | 2/2004 | Crue et al. | 360/125.12 |
| 7,038,881 B2 | 5/2006 | Ito et al. | |
| 7,116,517 B1 | 10/2006 | He et al. | |
| 7,133,253 B1 | 11/2006 | Seagle et al. | |
| 7,151,647 B2 | 12/2006 | Sasaki et al. | |
| 7,193,815 B1 | 3/2007 | Stoev et al. | |
| 7,324,304 B1 * | 1/2008 | Benakli et al. | 360/125.33 |
| 7,430,095 B2 * | 9/2008 | Benakli et al. | 360/125.15 |
| 2004/0061973 A1 * | 4/2004 | Crue et al. | 360/126 |
| 2004/0233578 A1 | 11/2004 | Gao | |
| 2006/0044677 A1 | 3/2006 | Li | |
| 2006/0198050 A1 * | 9/2006 | Mochizuki et al. | 360/126 |
| 2006/0256471 A1 * | 11/2006 | Plumer et al. | 360/122 |
| 2008/0068748 A1 * | 3/2008 | Olson et al. | 360/110 |
| 2009/0154021 A1 | 6/2009 | Nunokawa | |
| 2009/0268344 A1 * | 10/2009 | Guan et al. | 360/119.02 |
| 2010/0157474 A1 | 6/2010 | Hsiao | |
| 2010/0157475 A1 | 6/2010 | Hsiao | |
| 2010/0277832 A1 * | 11/2010 | Bai et al. | 360/125.03 |
| 2011/0273800 A1 * | 11/2011 | Takano et al. | 360/125.12 |

* cited by examiner

*Primary Examiner* — Mark Blouin
(74) *Attorney, Agent, or Firm* — Braden Katterheinrich

(57) ABSTRACT

In certain embodiments, an apparatus includes a write pole tip having a top side that has a monotonically decreasing slope that forms a convex profile between a write pole paddle and an air bearing surface.

In certain embodiments, an apparatus includes a write pole tip having a first and second top bevel. The first top bevel is at an angle greater than the second top bevel with respect to a plane perpendicular to an air bearing surface of the write pole tip.

16 Claims, 6 Drawing Sheets

DEVICES INCLUDING A WRITE POLE TIP WITH A CONVEX SHAPE

SUMMARY

Certain embodiments of the present invention are generally directed to devices that include a write pole tip with a convex shape.

In certain embodiments, an apparatus includes a write pole tip having a top side that has a monotonically decreasing slope that forms a convex profile between a write pole paddle and an air bearing surface.

In certain embodiments, an apparatus includes a write pole tip having a first and second top bevel. The first top bevel is at an angle greater than the second top bevel with respect to a plane perpendicular to an air bearing surface of the write pole tip.

DETAILED DESCRIPTION

The present disclosure relates to write poles for use in magnetic recording heads. As will be recognized by those skilled in the art, many data storage devices can be provisioned with magnetic recording heads that utilize write poles.

Figure 6:
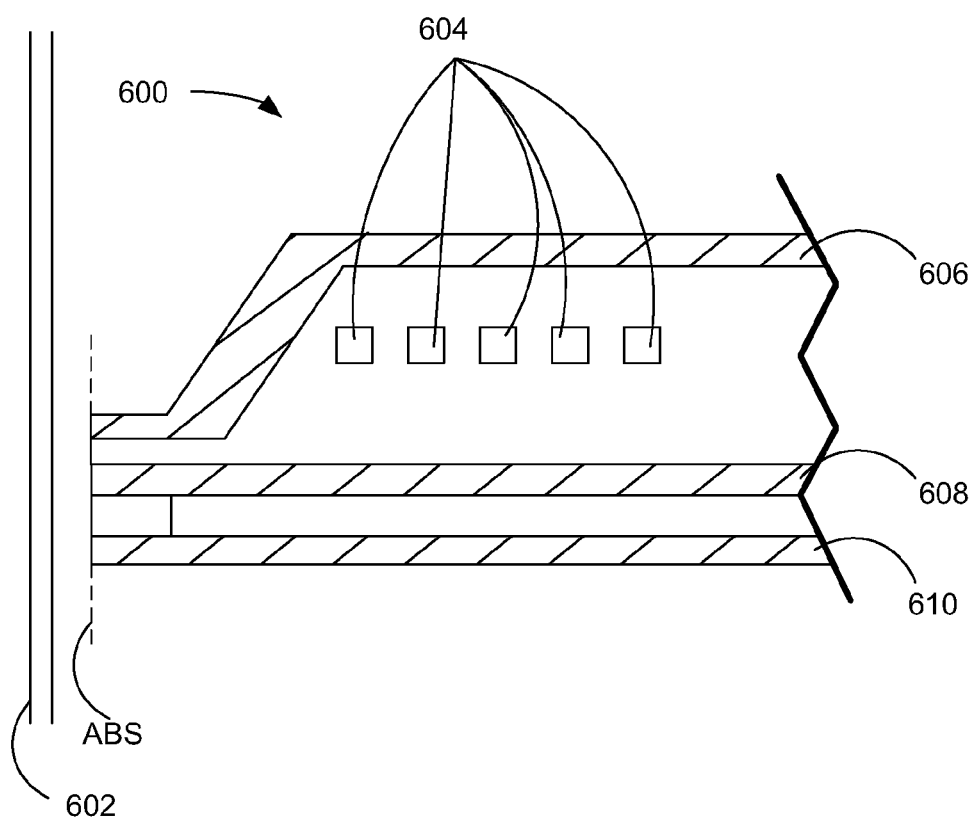
FIG. 6 provides a side view of an exemplary magnetic recording head.

Data storage devices, such as hard disc drives, can be provisioned with a magnetic recording head 600, as shown in FIG. 6, and a rotatable medium 602 to which data are stored along a number of concentric tracks. A head gimbal assembly allows precise positioning of the magnetic recording head 600 adjacent the tracks. To write data to the recording medium 602, an electrical current is caused to flow through conductive coils 604 on the magnetic recording head 600. The coil current induces a magnetic field across the write poles 606, 608. By reversing the polarity of the current through the coils 604, the polarity of the data written to the recording medium 602 is also reversed. Typically, the top pole 606 is used to physically write the data to the recording medium 602. Accordingly, it is the top pole 606 that defines the track width of the written data.

One way to increase storage capacity in magnetic recording is to increase the areal/track density at which information can be recorded and reliably read. As track density increases, the sizes of components in the magnetic recording head 600 shrink. For example, reading and writing to narrow track widths can be achieved by use of narrow pole tips at an air bearing surface (ABS) of the magnetic recording head 600. However, the pole width must be large in the paddle region of the write pole because the paddle region catches or gathers the magnetic field from the surrounding coils and funnels the magnetic field towards the write pole tip and eventually to the recording medium 602. The larger pole width allows adequate magnetic flux to be induced through the poles by the coil write current.

When the size of a recording head's write pole is reduced, effectively delivering magnetic flux from the write pole to a recording medium becomes problematic. For example, some problems include the inability of the write pole to accommodate the proper amount of flux to write data, i.e., the write field amplitude and gradient will not be sufficient to properly write data to the recording medium. The quality of the transition between bits will become poor as transition sharpness or resolution is degraded. These can accordingly decrease the signal-to-noise ratio and cause bit error rate loss.

Moreover, certain write pole geometries are inefficient because magnetic flux leaks from the write pole to a front shield (or sometimes referred to as a trailing shield), thereby reducing the amount of magnetic flux delivered to the recording medium. In terms of product reliability, over-asymmetry of the write pole geometry with respect to the write pole length center (in a down-track direction of a side-view of the write pole) will form complicated magnetization vertexes at a trailing edge of the write pole tip. This can generate remnant magnetic fringe fields from the write pole tip after write current is turned off, thereby causing erasure-after-write (EAW) in the recording bits.

Certain embodiments of the present disclosure are accordingly directed to devices that include write pole tips and trailing shields that can generate suitable flux delivery to a high areal density recording medium.

Figure 1:
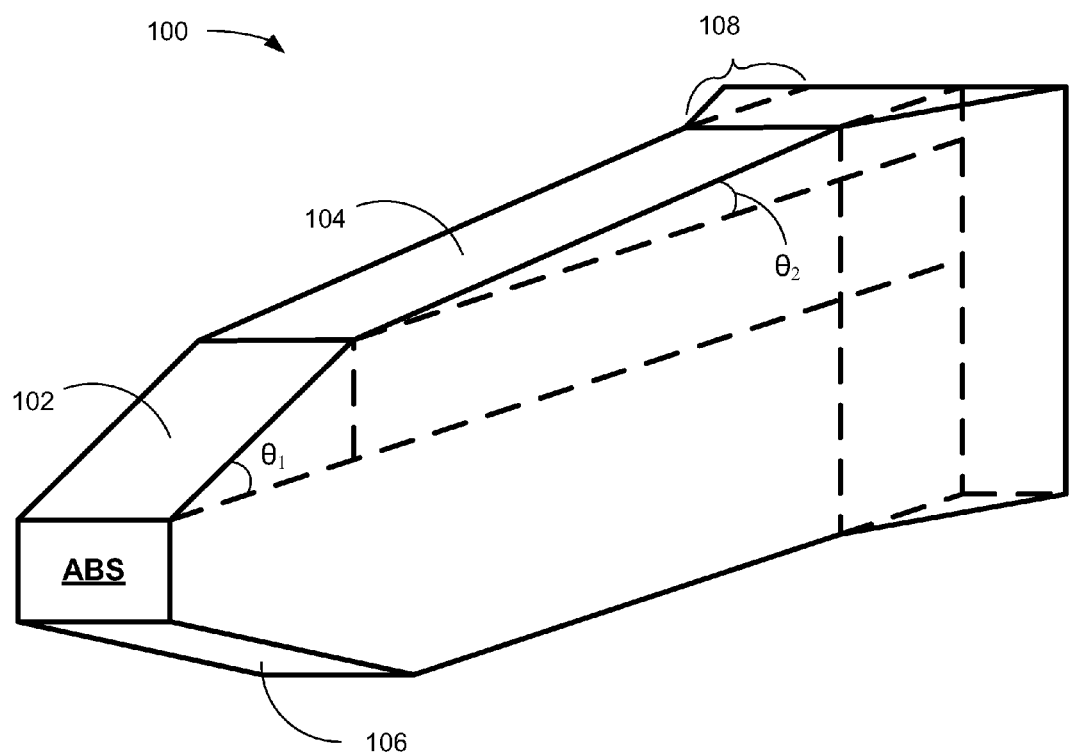
FIG. 1 provides an isometric view of an exemplary write pole, in accordance with certain embodiments of the present disclosure.

FIG. 1 shows a write pole tip 100 having a first top bevel 102, second top bevel 104, bottom bevel 106, and an air bearing surface (ABS). The dotted lines in FIG. 1 are included for convenience to show the geometry of the write pole tip 100. The first and second top bevels 102, 104 are slanted at an angle ($\theta_1$, $\theta_2$). As shown in FIG. 1, the angle of the first top bevel ($\theta_1$) is greater than the angle of the second top bevel ($\theta_2$) with respect to a plane perpendicular to the ABS; thereby forming a convex shape. A paddle portion 108 is located at the end of the write pole tip 100. As shown in FIG. 1, the paddle portion 108 can be tapered out as the paddle portion extends to a region of a magnetic recording head where conductive coils induce a magnetic field across the paddle portion 108; thereby permitting a wide pole width near the conductive coils an area sometimes referred to as the yoke. The write pole tip 100 and other portions of the write pole can comprise high moment materials like CoFe, CoFeNi, CoFeRh, CoFeRu, CoFePt, CoFePd and/or NiFe.

Figure 2:
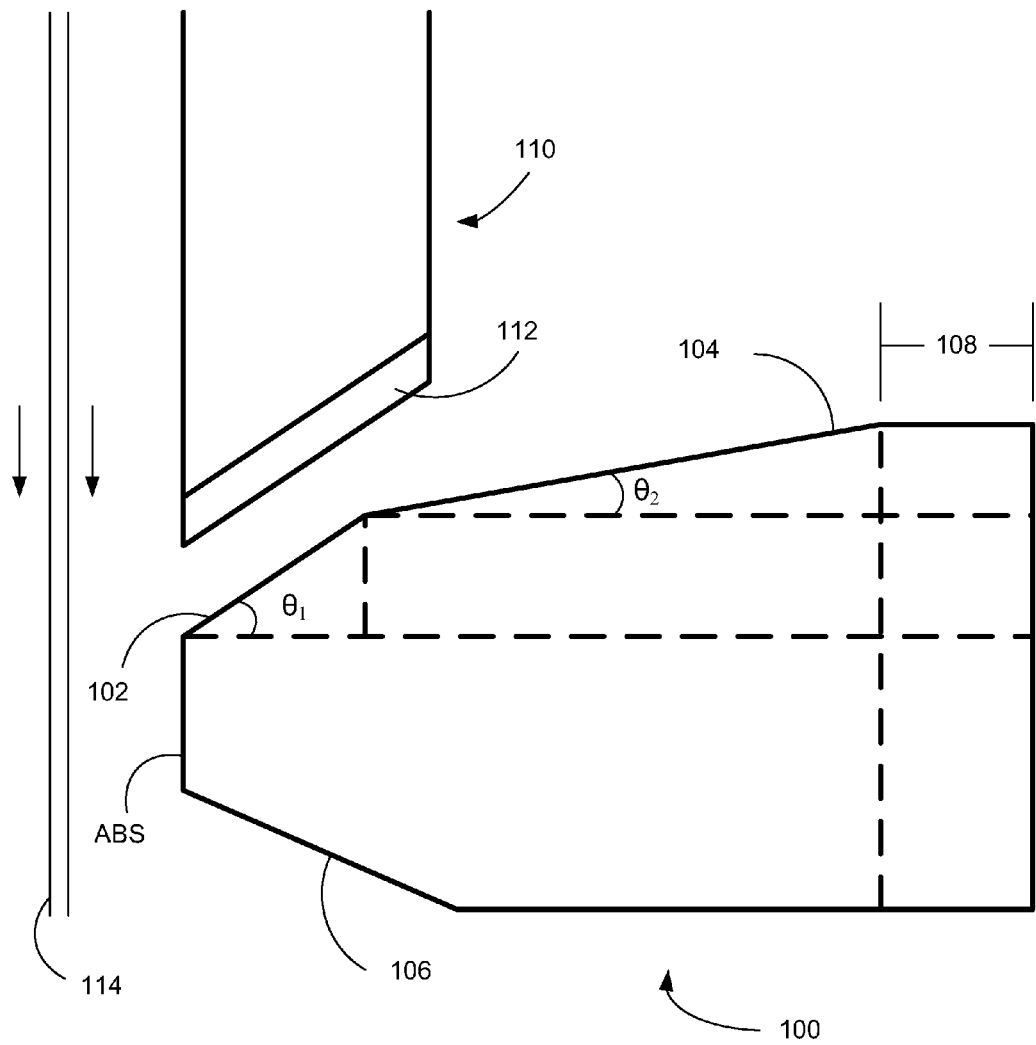
FIG. 2 provides a side view of the exemplary write pole of FIG. 1.

FIG. 2 is a side view of the write pole tip 100 of FIG. 1 and further includes a front shield 110 adjacent to the write pole tip 100 and facing the top side of the write pole tip 100. The front shield 110 includes a seed layer 112 comprising a high moment material such as, but not limited to, CoFe, CoFeNi, CoFeRh, CoFeRu, CoFePt, CoFePd and/or NiFe. As shown in FIG. 2, the front shield 110 has an angle substantially similar to that of the first top bevel 102, where substantially is meant to encompass insignificant deviations from an exact match of angles. As shown in FIG. 2, the write pole tip 100 hovers above a recording medium 114. As the write pole tip 100 travels in the direction of the arrows, the first and second top bevels 102, 104 are on a trailing edge of the write pole tip 100 and the bottom bevel 106 is on a leading edge of the write pole tip 100. The ABS faces the recording medium 114. Spacing and insulating layers near the write pole tip 100 are omitted for clarity. A diameter of the write pole tip 100 is smaller at the ABS than at the paddle portion 108.

Figure 3:
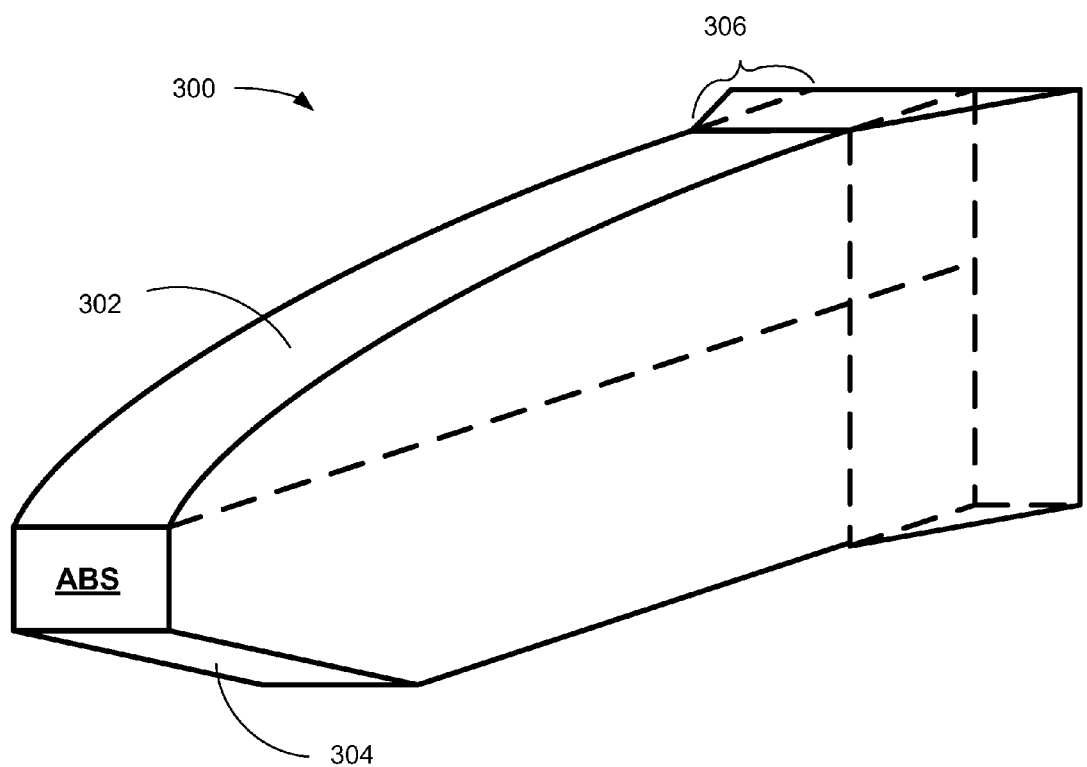
FIG. 3 provides an isometric view of an exemplary write pole, in accordance with certain embodiments of the present disclosure.

FIG. 3 shows a write pole tip 300 having a top side 302, bottom bevel 304, and an air bearing surface (ABS). The dotted lines in FIG. 3 are included for convenience to show the geometry of the write pole tip 300. The top side 302 is shaped to form a convex profile between the ABS and a paddle portion 306, located at the end of the write pole tip 300. As shown in FIG. 3, the convex shape monotonically decreases in slope beginning at the paddle portion 306 and ending at the ABS.

Figure 4:
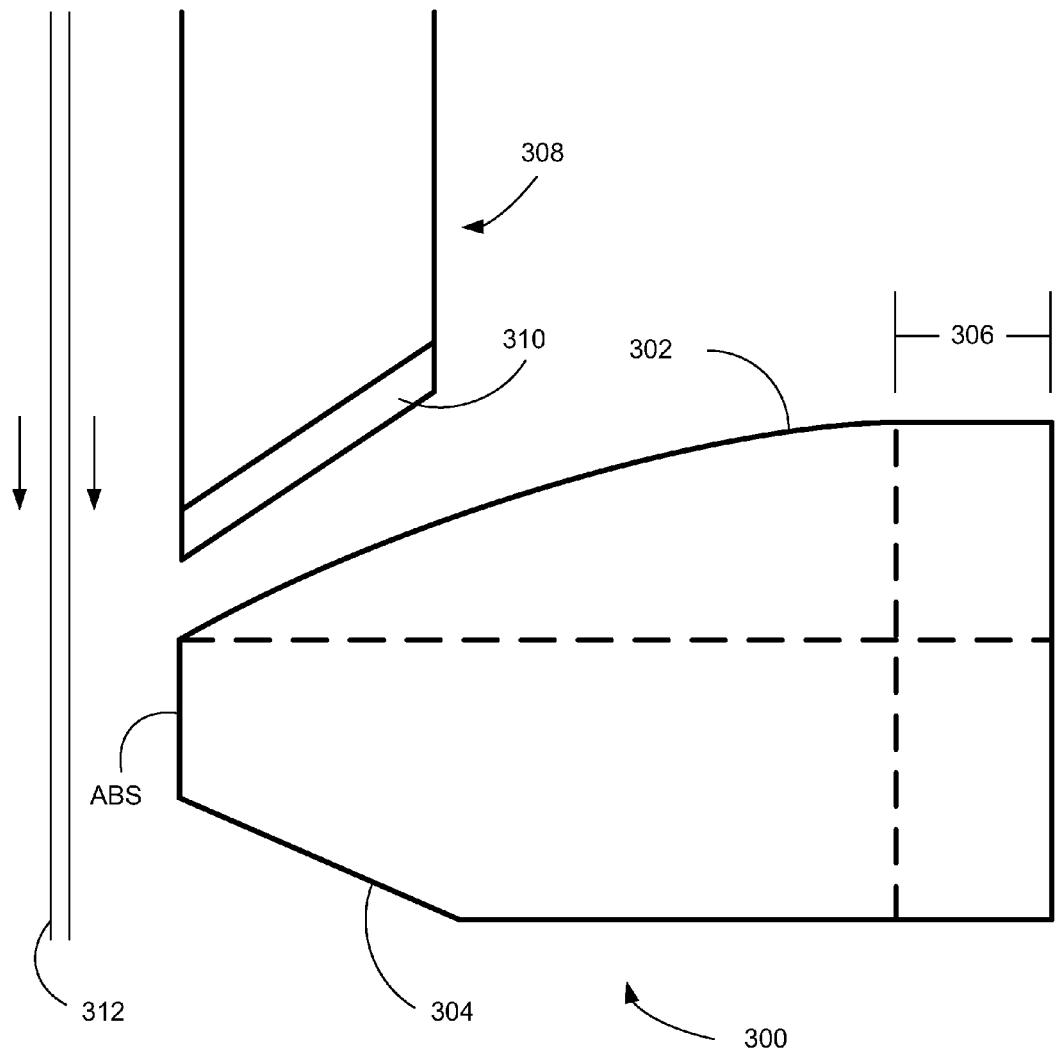
FIG. 4 provides a side view of the exemplary write pole of FIG. 3.

FIG. 4 is a side view of the write pole tip 300 of FIG. 3 and further includes a front shield 308 adjacent to the write pole tip 300 and acing the convex-shaped top side 302 of the write pole tip 300. The front shield 308 includes a seed layer 310 comprising a high moment material. As shown in FIG. 4, the write pole tip 300 hovers above a recording medium 312. As the write pole tip 300 travels in the direction of the arrows, the top side 302 is on a trailing edge of the write pole tip 300 and the bottom bevel 304 is on a leading edge of the write pole tip 300. The ABS faces the recording medium 312. Spacing and insulating layers near the write pole tip 300 are omitted for clarity.

Figure 5:
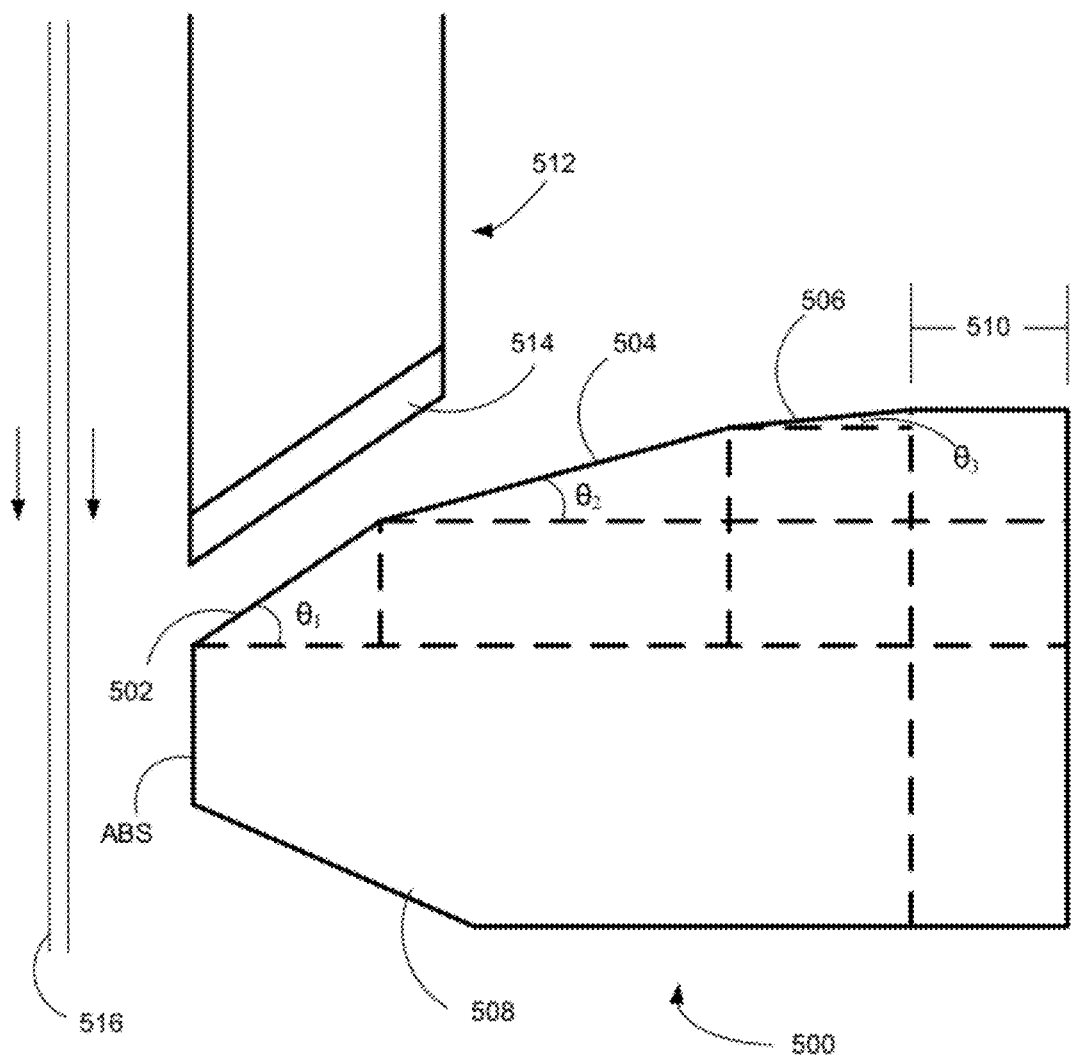
FIG. 5 provides a side view of an exemplary write pole, in accordance with certain embodiments of the present disclosure.

FIG. 5 shows a write pole tip 500 having a first top bevel 502, second top bevel 504, third top bevel 506, bottom side 508, and an air bearing surface (ABS). The dotted lines in FIG. 5 are included for convenience to show the geometry of the write pole tip 500. The first, second, and third top bevels 502, 504, 506 are slanted at an angle ($\theta_1, \theta_2, \theta_3$). As shown in FIG. 5, the angle of the first top bevel ($\theta_1$) is greater than the angle of the second top bevel ($\theta_2$), which is greater than the angle of the third top bevel ($\theta_3$) with respect to a plane perpendicular to the ABS; thereby forming a convex shape. A paddle portion 510 is located at the end of the write pole tip 500. A front shield 512 is located adjacent to the write pole tip 500 and facing the first, second, and third top bevels 502, 504, 506 of the write pole tip 500. The front shield 512 includes a seed layer 514 comprising a high moment material.

As shown in FIG. 5, the write pole tip 500 hovers above a recording medium 516. As the write pole tip 500 travels in the direction of the arrows, first, second, and third top bevels 502, 504, 506 are on a trailing edge of the write pole tip 500 and the bottom side 508 is on a leading edge of the write pole tip 500. The ABS faces the recording medium 516. Spacing and insulating layers near the write pole tip 500 are omitted for clarity.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising:
a write pole tip having a first top bevel and a second top bevel, wherein the first top bevel is at an angle greater than the second top bevel with respect to a plane perpendicular to an air bearing surface of the write pole tip.

2. The apparatus of claim 1, further comprising:
a front shield positioned adjacent to the write pole tip and having an angle substantially the same as the first top bevel angle.

3. The apparatus of claim 1, wherein the write pole tip further comprises a bottom bevel.

4. The apparatus of claim 1, wherein the first top bevel is positioned closer to the air bearing surface than the second top bevel.

5. The apparatus of claim 1, wherein the write pole tip further comprises greater than two top bevels.

6. An apparatus comprising:
a write pole tip having a top side that has a monotonically decreasing slope forming a convex profile between a write pole paddle and an air bearing surface.

7. The apparatus of claim 6, wherein the convex profile comprises at least two bevels.

8. The apparatus of claim 6, wherein a first top bevel is at an angle greater than a second top bevel with respect to a plane perpendicular to an air bearing surface of the write pole tip.

9. The apparatus of claim 6, wherein the convex profile continuously decreases in slope.

10. The apparatus of claim C, wherein the top side faces a front shield positioned adjacent to the write pole.

11. The apparatus of claim 6, wherein the write pole tip includes a bottom bevel.

12. An apparatus comprising:
a write pole tip having a first top bevel and a second top bevel, wherein the first top bevel is at an angle different than the second top bevel with respect to a plane perpendicular to air bearing surface of the write pole tip.

13. The apparatus of claim 12, further comprising:
a front shield positioned adjacent to the write tip and having an angle substantially the same as the first top bevel angle.

14. The apparatus of claim 12, wherein the write pole tip further comprises greater than two top bevels.

15. The apparatus of claim 12, wherein the write pole tip further comprises a bottom bevel.

16. The apparatus of claim 12, wherein the write pole tip further comprises greater than two top bevels.

* * * * *